United States Patent
MacNab et al.

[15] 3,679,920
[45] July 25, 1972

[54] SUPERCONDUCTING DYNAMO-ELECTRIC MACHINES

[72] Inventors: Robert Beattie MacNab; Brian Edward Mulhall, both of Newcastle upon Tyne, England

[73] Assignee: International Research & Development Company, Newcastle upon Tyne, England

[22] Filed: April 1, 1971

[21] Appl. No.: 130,242

[30] Foreign Application Priority Data

April 9, 1970  Great Britain ...................... 17,007/70

[52] U.S. Cl. .................................... 310/10, 310/40, 310/52
[51] Int. Cl. ........................................................ H01v 11/00
[58] Field of Search .......................................... 310/10, 40, 52

[56] References Cited

UNITED STATES PATENTS 3,368,087  2/1968  Madsen .................................... 310/10
3,005,117  10/1961  Buchhold .................................. 310/40

*Primary Examiner*—D. X. Sliney
*Attorney*—Kemon, Palmer & Estabrook

[57] ABSTRACT

An A.C. generator has a superconducting D.C. field winding on the rotor and a multi-phase A.C. winding on the stator. To prevent A.C. loss in the superconducting winding an electromagnetic flux screen is interposed between the windings and is secured to the rotor. In a preferred construction the flux screen is part of an outer rotor cylinder of strong mechanical construction which operates at ambient temperature. The outer rotor cylinder is coupled for rotation with an inner cylinder which carries the superconducting winding, is of relatively light construction to minimize heat inflow and is separated from the outer cylinder by a vacuum space.

21 Claims, 6 Drawing Figures

SUPERCONDUCTING DYNAMO-ELECTRIC MACHINES

This invention relates to superconducting dynamo-electric machines and is more particularly concerned with screening of superconducting windings in such machines from time-varying magnetic fields.

In co-pending U.S. Pat. application Ser.No.43693 we disclose a synchronous alternating current machine having a field winding of superconducting material and means for cooling the winding to enable the material to become superconducting. Such a machine may be arranged, for example, as an alternating current generator in which the superconducting field winding is a rotor winding supplied with direct current and the stator winding is a multi-phase armature winding such as the conventional three-phase type.

In conventional generators having three-phase stator windings and non-superconducting rotor field windings it is known that under conditions of steady operation in which the generator supplies an accurately balanced three-phase load and if undesirable harmonic magneto-motive forces in the stator winding are neglected, then the rotor winding of the machine is not subjected to a time-varying magnetic flux. In practice, however, the operation of such machines involves their supplying power to loads which are rarely, or never, perfectly balanced and which for some periods may be substantially unbalanced. Under such circumstances, the three-phase stator windings may carry substantial negative sequence components of current which subject the rotor winding to a time-varying magnetic flux of considerable amplitude.

Whilst in conventional machines the phenomenon described has presented design problems which have been adequately resolved in the production of practical generators, the use of a superconducting field winding presents a further problem when such operating conditions are met since practical superconducting materials exhibit an undesirably high power loss when subjected to time-varying magnetic flux. This loss is known in the art as 'A.C. loss' and is akin to hysteresis loss in the magnetization of iron.

In accordance with the present invention there is provided a dynamo-electric machine having a stator winding and a rotor winding, one of said windings being a superconducting direct current winding, and the other winding being designed to carry alternating currents which in the operation of the machine will tend to produce a magnetic flux pattern varying with respect to the superconducting winding, wherein an electromagnetic flux screen is disposed between the two windings and is rotationally fixed relative to the superconducting winding, the flux screen being designed to shield the superconducting winding from the said varying flux pattern and thereby prevent A.C. loss in the superconducting winding while allowing the constant flux of the superconducting winding to interact with the other winding.

The flux screen has the further advantage of preventing eddy current loss in any electrically-conductive material present in the region protected by the screen, for example in the structure supporting the superconducting winding.

Preferably the rotor winding is the superconducting direct current winding and forms a field winding for the machine and the screen forms part of the rotor of the machine and surrounds the superconducting winding.

In a preferred construction to be described in more detail below the screen takes the form of a hollow cylinder carried by an outer part of the rotor and spaced from an inner part of the rotor which carries the superconducting winding. The superconducting winding is located in the surface of the inner rotor part and is held in position by sleeves. A sealed vacuum space is formed between the inner and outer parts of the rotor and a thermal radiation shield is located in the vacuum space. In this construction the screen is non-superconducting material and operates substantially at ambient temperature. The screen is carried by the outer rotor part which bounds the vacuum space which provides thermal insulation for the superconducting winding carried by the inner rotor part. The separation of the rotor into two parts has the further advantage that whereas the outer part can be of sufficiently strong and heavy construction to withstand the mechanical forces to which it is subjected by the varying magnetic fields, the inner part can be of relatively thin construction to minimize the inflow of heat to the superconducting winding.

In an alternative construction the screen includes superconducting material and in this case can be carried directly on the outer surface of the rotor in thermal contact with the superconducting winding to ensure the cooling of the screen to superconducting temperatures. The superconducting screen should be surrounded by a vacuum enclosure which also surrounds the superconducting winding.

In either of the constructions described the superconducting winding can be located in the outer surface of its supporting body and held in place by sleeves or disposed within a hollow supporting body.

The superconducting screen can consist of superconducting wire or strip applied to a support. The wire or strip can be composed of niobium titanium, niobium-zirconium alloy or niobium-tin intermetallic compounds and should be stabilized and protected thermally against electrical heating caused by currents flowing therein.

In order that the invention may be more clearly understood it will now be further described with reference to the accompanying drawings, in which.

Figure 1:
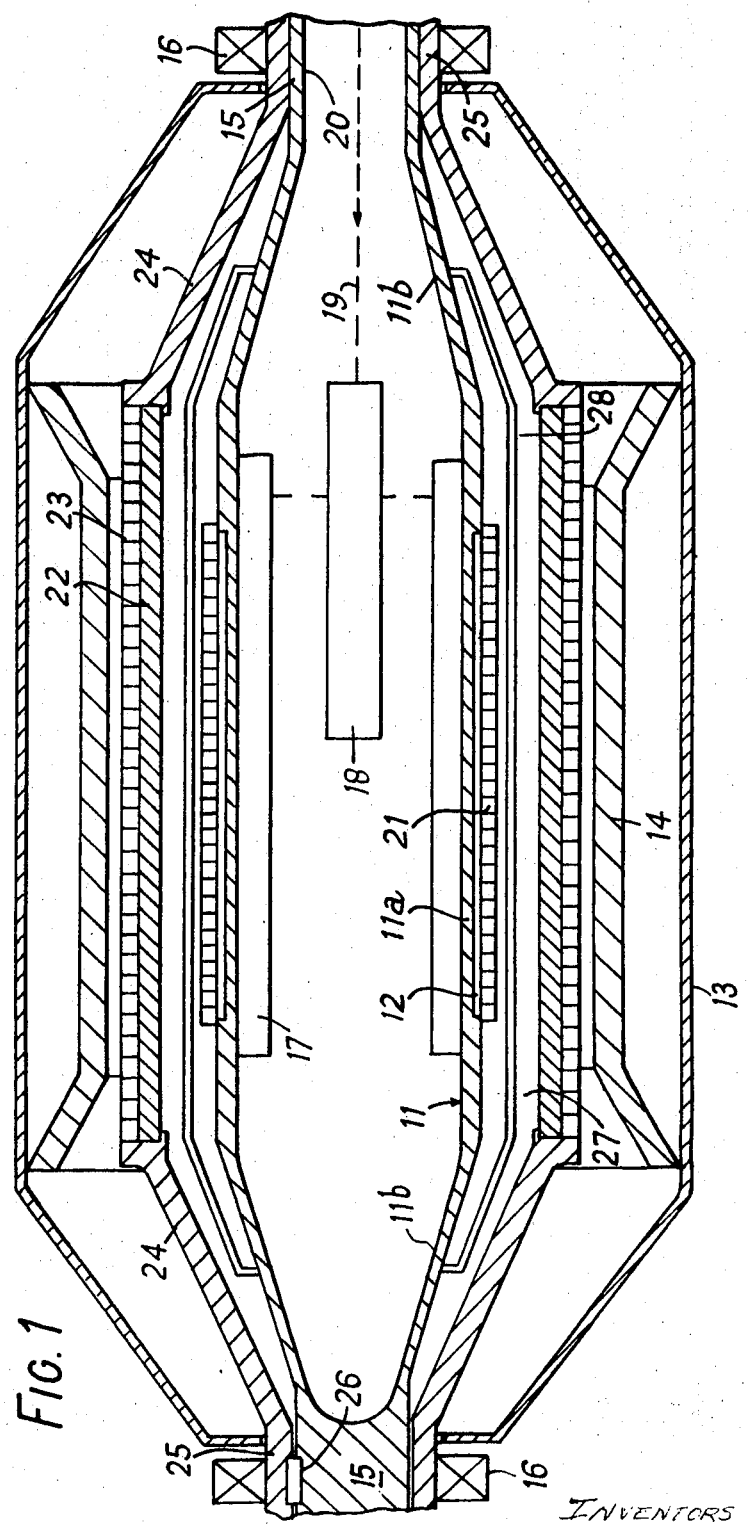
FIG. 1 shows a simplified longitudinal section through a superconducting synchronous A.C. generator in accordance with the preferred form of the invention.

Referring first to FIG. 1 of the drawings, this shows a longitudinal section of an A.C. generator having a superconducting rotor field winding and provided with a non-superconducting electromagnetic flux screen in accordance with the preferred form of the invention.

The generator comprises a rotor whose inner part 11 supports a superconducting rotor field winding 12 and a stator 13 supporting a non-superconducting winding 14. The winding 14 is a multi-phase A.C. winding whilst the winding 12 serves to carry direct current for the excitation of the machine.

The inner part 11 of the rotor comprises a support cylinder 11a of non-magnetic material such as stainless steel, titanium, or material reinforced with carbon fibers, and two hollow conical transition members 11b one at each end of the support cylinder. The members 11b join the support cylinder to rotor stub shafts 15 which are supported in bearings 16. The rotor winding 12 is cooled by means of a cooling system represented schematically as comprising cooling passages 17 associated with the winding support cylinder 11a and supplied with cryogenic fluid by a refrigeration unit 18 mounted within the support cylinder 11a. The supply of cryogenic fluid to the refrigeration unit 18 is by way of a conduit 19 which enters through a coaxial passage 20 in one of the stub shafts 15.

The rotor winding 12 is wound in slots in the outer surface of the support cylinder 11a and is retained in the slots by means of retaining sleeves 21 of non-magnetic material such as stainless steel or aluminum. The support cylinder 11a must be capable of withstanding high stress at low temperatures and can, for example, be of stainless steel or titanium alloy.

Surrounding but spaced from the superconducting rotor winding 12 and disposed between the rotor winding 12 and the stator winding 14 there is a hollow cylindrical screen 22 of high-conductivity metal, such as aluminum. The screen 22 is strengthened in the radial direction by an outer wall 23 of higher strength material such as titanium alloy and the double-walled structure composed of the screen 22 and the outer wall 23 is supported by hollow end cones 24. The outer wall 23 is formed of a plurality of rings which are shrink-fitted onto the screen 22 and the cones 24 are bolted to the ends of the screen. The outer ends of the cones 24 are integral with sleeves 25 which are mounted in the bearings 16 and within which the stub shafts 15 of the inner part of the rotor are located. As shown at the left-hand side of FIG. 1 the sleeve 25 at that end of the rotor is coupled by keys 26 to the solid stub shaft 15 to ensure that the screen 22 rotates with the superconducting winding 12, the cones 24 with the screen 22 and outer wall 23 thus forming an outer part of the rotor which encloses the inner part 11. At each end of the rotor seals (not shown) are provided between the inner and outer members of the rotor to seal off the space 27 between these parts. At least one of the seals is of bellows type to allow for differential thermal expansion in the two parts. The space 27 is evacuated and a thermal radiation shield 28 is mounted within this space to reduce the inflow of heat to the superconducting winding 12.

It is not essential that the screen 22 should be of material of high conductivity and it may be constructed, for example, of aluminum alloys, copper, stainless steels, or titanium alloys, or a combination of these materials. Alternative materials for the outer wall 23 are synthetic plastics materials reinforced with glass fibers or carbon fibers.

Figure 2:
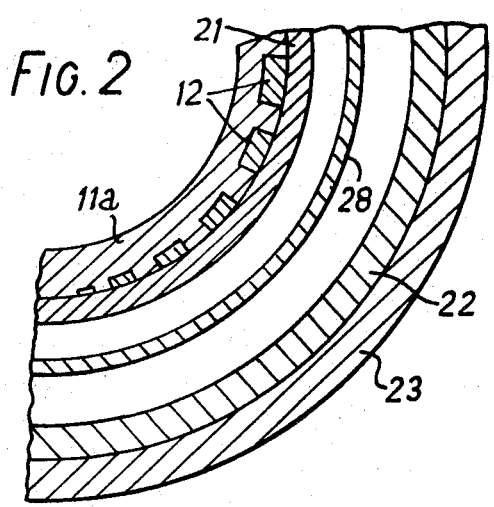
FIG. 2 shows a portion of a transverse section through the rotor of the machine shown in FIG. 1.
Figure 3:
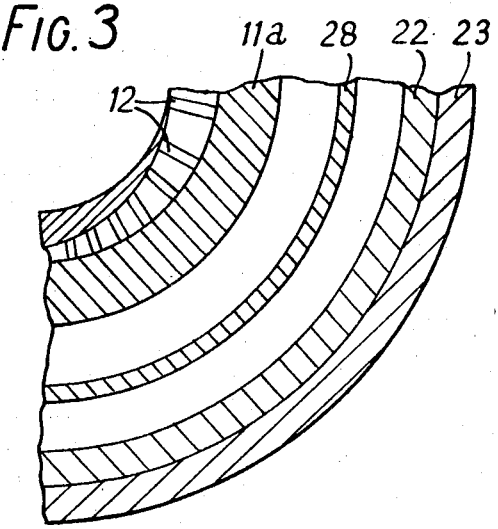
FIG. 3 shows a similar view to FIG. 2 of an alternative form of rotor for the machine shown in FIG. 1.

Whereas in the embodiment of FIGS. 1 and 2 the conductors of the winding 12 are embedded in the outer surface of the support cylinder 11a and retained by the sleeve 21, as clearly seen in the cross-section of FIG. 2, FIG. 3 shows an alternative arrangement in which the conductors of the winding 12 are supported on the inside of the support cylinder 11a. In each case the cross-section of the conductors varies around the periphery of the rotor to give a sinusoidal flux distribution.

Figure 4:
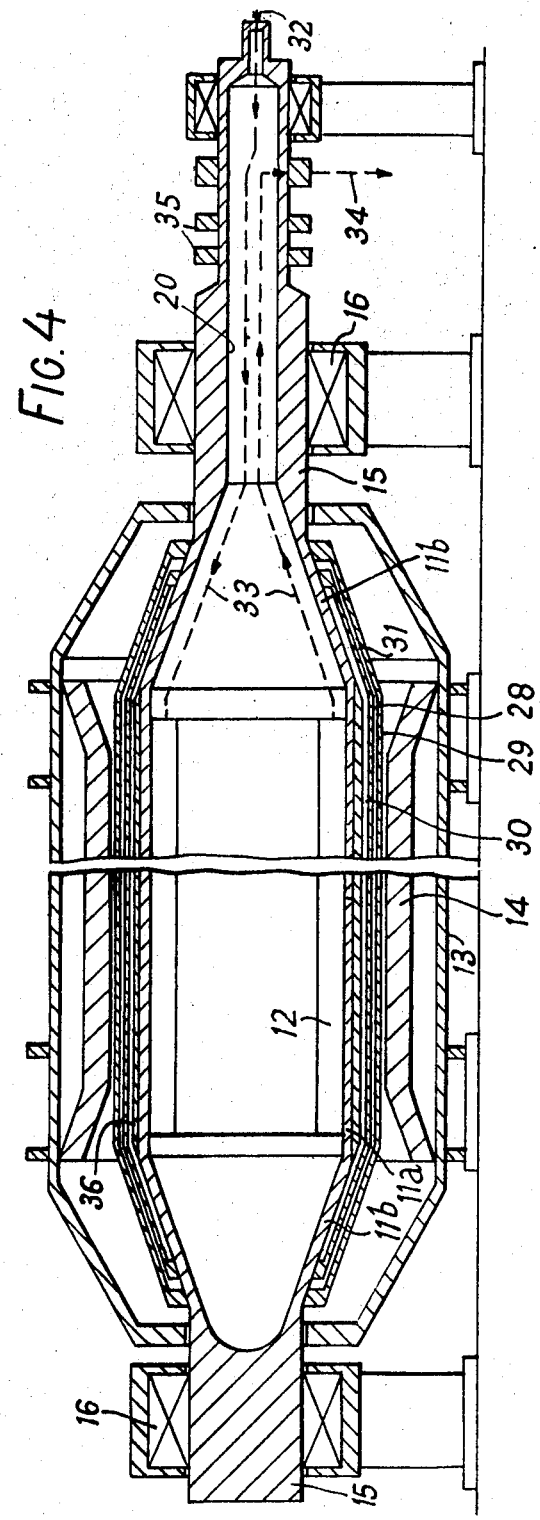
FIG. 4 shows a simplified longitudinal section through a superconducting synchronous A.C. generator rotor in accordance with an alternative form of the invention to those shown in FIGS. 1–3, in which a superconducting eddy current flux screen is used.
Figure 5:
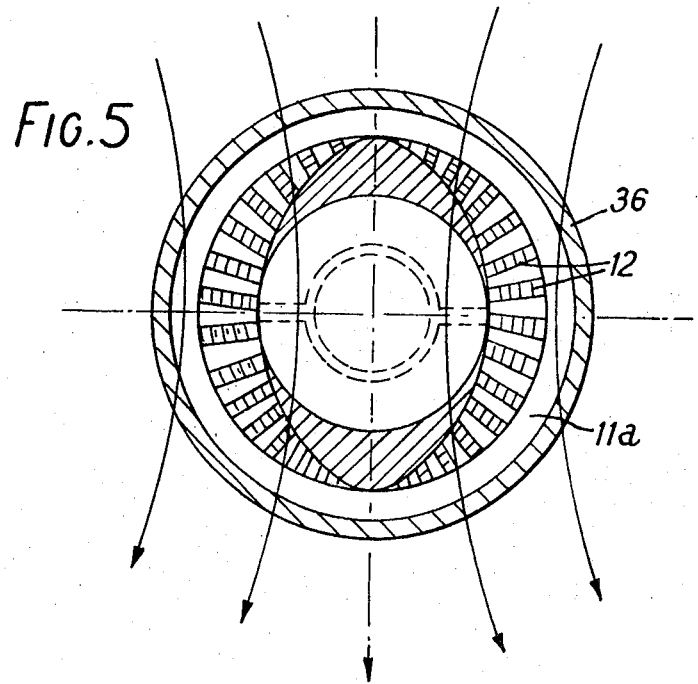
FIG. 5 shows a portion of a transverse section through the rotor shown in FIG. 4.
Figure 6:
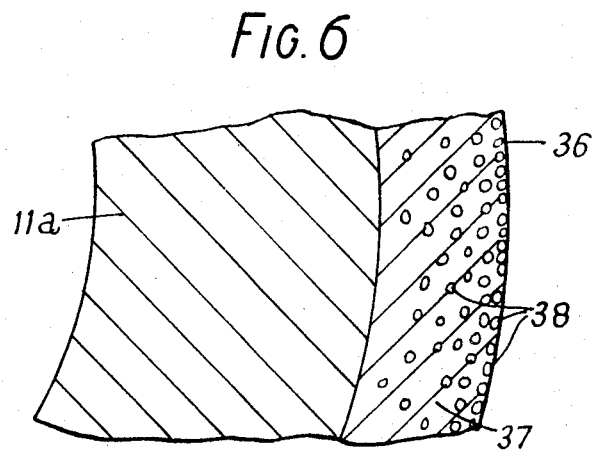
FIG. 6 is an enlarged view of part of the assembly shown in FIG. 5.

Referring now to FIGS. 4 to 6, these show a synchronous A.C. generator of the type described in the above-mentioned co-pending application, to which reference is made for any additional description required. The generator has a structure similar in some respects to the generator of FIGS. 1 to 3 and similar parts are given identical reference numerals.

As in the embodiment of FIGS. 1 to 3 the rotor comprises a support cylinder 11a of non-magnetic material such as stainless steel, titanium, or reinforced synthetic resin, and two hollow conical transition members 11b, one at each end of the rotor. The transition members 11b connect the support cylinder 11a to stub shafts 15 which are carried in bearings 16. The rotor carries the superconducting winding 12 which is disposed within the support cylinder 11a. The stator 13 carries an A.C. winding 14 of non-superconducting material.

Surrounding the support cylinder 11a and transition members 11b is the radiation shield 28 which is in spaced relation to the support cylinder and transition members except at the ends where it comes into contact with the transition members. Surrounding but spaced from the radiation shield 28 is an outer casing 29. The shield 28 is preferably of high thermal conductivity material to facilitate cooling and could, for example, be of aluminum alloy. The casing 29 forms a vacuum containment vessel and is required to be of high strength/weight ratio material such as aluminum, titanium or stainless steel. The casing 29 may be welded to the stub shaft 15 at each end of the rotor.

The spaces 30 and 31 between the support cylinder 11a and the radiation shield 28 and between the radiation shield and the casing 29 respectively are under vacuum or at low pressure to reduce heat inflow. Material of low thermal conductivity such as aluminized mylar (R.T.M.) or aluminum and glass fiber may be located in the spaces 30 and 31 to reduce heat inflow.

The rotor winding 12 of superconducting material is supported on the inside of the cylinder 11a as shown in FIG. 5 and is embedded in a material such as epoxy resin which hardens to form a bond between the windings and between the windings and the cylinder.

The stator winding 14 is of non-superconducting material and can be of conventional form e.g., a double layer winding except that, as core iron is not necessary, the winding can be encased in an epoxy resin as in the case of the rotor winding. Again the stator winding has not been shown in detail for the sake of clarity. The diameter of the individual wires in the stator winding must be kept small and in a typical case would be of the order of 1mm. diameter.

The outer casing 13 of the stator is spaced from the winding 14 and must act as a magnetic shield for the machine because of the high magnetic fields present. One way of achieving this, is for the casing to be made of laminated magnetic material such as iron or mild steel. Alternatively a separate magnetic shield may be located between the casing and the stator winding.

To cool the superconducting winding 12 a cryogenic fluid such as supercritical helium gas is fed through an inlet 32 in the end of the stub shaft 15 at the right-hand end of the machine and passes by way of ducting 33, extending through the passage 20, to the winding 12. The cryogenic fluid leaves the rotor again through an outlet 34 in the stub shaft 15. Depending on the size of the machine, it may be necessary to carry out the final stage of refrigeration inside the rotor itself to reduce the cryogenic fluid to the temperature necessary to maintain the winding 12 in a superconducting state, in which case, a small refrigerating unit could be incorporated in the space within the rotor in addition to the main refrigerator located outside the machine. Alternatively, the whole or the major portion of the refrigeration cycle may be carried out inside the rotor. In the case where the whole of the cycle is carried out inside the rotor the cryogenic fluid would be supplied to the rotor at normal temperatures and several atmospheres pressure, typically 7 ata, and returned from the rotor at near normal temperatures and pressures, typically 1.2 ata.

Excitation current is fed to the rotor winding 12 through slip rings 35 or the stub-shaft 15 and these slip rings operate at normal temperatures.

An electromagnetic flux screen 36 is positioned in the air-gap between the rotor winding 12 and the stator winding 14 and is carried by the rotor so that it rotates therewith. The screen 36 takes the form of a layer of stabilized superconducting wire or strip wound on to the radially outer surface of the support cylinder 11a. The screen may also extend over the surface of conical transition members 11b.

The superconducting wire or strip may be of niobium-titanium or niobium-zirconium alloy, or of niobium-tin inter-metallic compound. This wire or strip is stabilized and protected thermally against the electrical heating due to currents passing therethrough by associating the superconducting material with a highly thermally conducting, but non-superconducting material, such as copper, which either forms a substrate upon which the superconducting material is carried or a matrix through which filaments of superconducting material pass. Where strip material having e.g. a copper substrate is used, the screen is formed so that the substrate lies within the region shielded from time-varying magnetic flux by the superconducting material of the screen. Where strip or wire material having filaments of superconducting material within a matrix of copper or other suitable material is used, copper may be removed to present the superconducting material at the surface of the strip or wire, the screen again being formed so that the matrix lies in the shielded region.

The sectional views of FIGS. 5 and 6 show the support cylinder 11a provided with an enveloping screen 36 which consists of a copper matrix 37 containing filaments 38 of superconducting material. The radially outer surface layers of the composite envelope are removed to expose superconducting filaments. It will be appreciated that these filaments are located more adjacent the source of A.C. loss than the bulk of the matrix, the source of A.C. loss being the multi-phase stator windings 14 which, in use, are commonly unequally loaded.

The removal of the matrix material may be effected subsequent to the formation of the screen.

If a strip-form screen is used, it should be wound over the rotor support cylinder 11a in such a direction as to minimize A.C. loss, by arranging that the winding direction follows as nearly as possible the paths of circulating current therethrough when the machine is operating. One way of winding includes the provision of strips extending longitudinally over the support cylinder, with one or more circumferential turns of strip at either end of the support cylinder.

What is claimed is:

1. A dynamo-electric machine having a stator winding and a rotor winding, said rotor winding being a superconducting direct current winding, and said stator winding being designed to carry alternating currents which in the operation of the machine will tend to produce a magnetic flux pattern varying with respect to said superconducting winding, wherein the rotor structure of the machine includes an electromagnetic flux screen disposed between the two windings and which rotates with said superconducting winding but is fixed relative to said superconducting winding, said flux screen shielding said superconducting winding from the said varying flux pattern and thereby preventing A.C. loss in said superconducting winding while allowing the constant flux of said superconducting winding to interact with said stator winding.

2. A dynamo-electric machine as claimed in claim 1 in which the screen is spaced from the superconducting winding and the space is evacuated to provide heat insulation for the superconducting winding.

3. A dynamo-electric machine as claimed in claim 2 having a radiation shield disposed in the evacuated space and spaced from the screen and from the superconducting winding.

4. A dynamo-electric machine as claimed in claim 1 in which the rotor comprises an inner part carrying the superconducting winding and an outer part carrying the screen, the two parts being supported coaxially and locked against relative rotation.

5. A dynamo-electric machine as claimed in claim 4 in which the outer rotor part has at each end a sleeve shaft supported in a bearing and the inner part has a central section carrying the superconducting winding and end sections of hollow frusto-conical form joining the central section to stub shafts mounted within and coupled for rotation with the sleeve shafts of the outer rotor part.

6. A dynamo-electric machine as claimed in claim 5 in which the outer part is spaced from the inner part throughout the length of the central and end sections of the inner part, the sleeve shafts of the outer part are sealed to the stub shafts of the inner part and the space between the inner and outer parts is evacuated.

7. A dynamo-electric machine as claimed in claim 6 having a thermal radiation shield disposed in the said vacuum space.

8. A dynamo-electric machine as claimed in claim 4 in which the screen comprises a cylindrical wall of metal of high electrical conductivity and a cylindrical supporting wall of higher mechanical strength closely surrounds the screen wall.

9. A dynamo-electric machine as claimed in claim 8 in which the supporting wall and the screen wall are held together by shrink fitting.

10. A dynamo-electric machine as claimed in claim 9 in which the supporting wall is composed of a plurality of elemental rings.

11. A dynamo-electric machine as claimed in claim 1 in which the rotor comprises a supporting body with the superconducting winding located in the radially outer surface of the supporting body.

12. A dynamo-electric machine as claimed in claim 11 having winding retaining sleeves encircling the supporting body.

13. A dynamo-electric machine as claimed in claim 1 in which the rotor comprises a hollow supporting body within which the superconducting winding is mounted.

14. A dynamo-electric machine as claimed in claim 1 in which the flux screen includes superconducting material.

15. A dynamo-electric machine as claimed in claim 14 in which the rotor comprises a supporting body on which the superconducting winding is mounted and the screen is mounted on the radially outer surface of the supporting body.

16. A dynamo-electric machine as claimed in claim 15 in which the screen is in thermal communication with the superconducting rotor winding whereby the screen is cooled by the cooling system for the winding.

17. A dynamo-electric machine as claimed in claim 16 in which the superconducting winding is mounted on the inside of a hollow supporting body.

18. A dynamo-electric machine as claimed in claim 16 in which the superconducting winding is located in the outer surface of the supporting body.

19. A dynamo-electric machine as claimed in claim 18 having retaining sleeves surrounding the screen and the superconducting winding.

20. A machine as claimed in claim 15 in which the screen consists of lengths of superconducting material supported in a matrix of highly thermally conductive, non-superconducting material.

21. A machine as claimed in claim 15 having a casing spaced from and surrounding the superconducting screen and winding on the supporting body to form a vacuum space for thermal insulation.

* * * * *